United States Patent
Cho

(10) Patent No.: US 9,599,074 B2
(45) Date of Patent: Mar. 21, 2017

(54) AIR CLEANER APPARATUS FOR VEHICLE AND MOLD UNIT FOR FABRICATING THE SAME

(71) Applicants: Hyundai Motor Company, Seoul (KR); Kia Motors Corp., Seoul (KR)

(72) Inventor: Yoon Geun Cho, Daegu (KR)

(73) Assignees: Hyundai Motor Company, Seoul (KR); Kia Motor Corp., Seoul (KR)

(*) Notice: Subject to any disclaimer, the term of this patent is extended or adjusted under 35 U.S.C. 154(b) by 79 days.

(21) Appl. No.: 14/525,171

(22) Filed: Oct. 27, 2014

(65) Prior Publication Data
US 2015/0285195 A1 Oct. 8, 2015

(30) Foreign Application Priority Data
Apr. 8, 2014 (KR) .................. 10-2014-0041915

(51) Int. Cl.
| F02M 35/02 | (2006.01) |
| F02M 35/024 | (2006.01) |
| B29C 45/33 | (2006.01) |
| B29C 45/37 | (2006.01) |

(Continued)

(52) U.S. Cl.
CPC .... *F02M 35/0201* (2013.01); *F02M 35/0202* (2013.01); *F02M 35/0203* (2013.01); *F02M 35/02416* (2013.01); *F02M 35/02491* (2013.01); *B29C 33/42* (2013.01); *B29C 45/33* (2013.01); *B29C 45/37* (2013.01); *B29C 45/44* (2013.01)

(58) Field of Classification Search
CPC .......... F02M 35/0201; F02M 35/0202; F02M 35/0203; F02M 35/02416; F02M 35/02491; B01D 46/0005; B01D 46/0006
USPC ......... 123/198 E, 195 C; 55/385.3, 481, 506
See application file for complete search history.

(56) References Cited

U.S. PATENT DOCUMENTS 5,569,311 A * 10/1996 Oda .................. B01D 46/0002
 55/493
5,725,624 A * 3/1998 Ernst .................. B01D 46/0005
 55/497

(Continued)

FOREIGN PATENT DOCUMENTS

| JP | H07-259669 A | 10/1995 |
| JP | 2008-38842 A | 2/2008 |

(Continued)

*Primary Examiner* — Grant Moubry
(74) *Attorney, Agent, or Firm* — Morgan, Lewis & Bockius LLP

(57) ABSTRACT

An air cleaner apparatus for a vehicle includes a body defining therein a storage space. The body has an intake port through which air is to be taken in, a laterally-bent support section disposed at an upper portion, and plate-shaped reinforcement members disposed above the storage space and having a predetermined thickness, wherein a cover is coupled to the upper portion of the body, defines therein a storage space, and has a discharge port at one side through which air is to be discharged and a laterally-bent coupling section disposed at a lower side, wherein an opening is provided at front sides of the body and cover, and serves as an entrance through which a filter member is stored or taken out, and wherein a plate-shaped cover is coupled to a front portion of the storage part in order to open or close the storage part.

8 Claims, 6 Drawing Sheets

(51) Int. Cl.
*B29C 45/44* (2006.01)
*B29C 33/42* (2006.01)

(56) References Cited

U.S. PATENT DOCUMENTS

| | | | | |
|---|---|---|---|---|
| 6,174,343 B1* | 1/2001 | Bloomer | ............ | B01D 46/0002 123/198 E |
| 6,217,627 B1* | 4/2001 | Vyskocil | ............ | B01D 46/0005 123/198 E |
| 6,808,547 B2* | 10/2004 | Ota | .................... | B01D 46/0006 55/478 |
| 7,771,502 B2* | 8/2010 | Germain | ............ | B01D 46/0005 55/481 |
| 9,169,811 B2* | 10/2015 | Cho | .................... | F02M 35/0201 |
| 9,255,555 B2* | 2/2016 | Cho | .................... | F02M 35/0203 |
| 2010/0236205 A1* | 9/2010 | Braithwaite | ............ | B01D 46/10 55/499 |
| 2012/0073252 A1* | 3/2012 | Lee | ................. | F02M 35/02491 55/385.3 |
| 2012/0192535 A1* | 8/2012 | Schrewe | ............ | B01D 46/0005 55/385.3 |

FOREIGN PATENT DOCUMENTS

| | | | |
|---|---|---|---|
| JP | 2008-248853 A | 10/2008 |
| KR | 10-2013-0021786 A | 3/2013 |
| KR | 10-2013-0061599 A | 6/2013 |
| KR | 10-1318188 B1 | 10/2013 |

\* cited by examiner

600

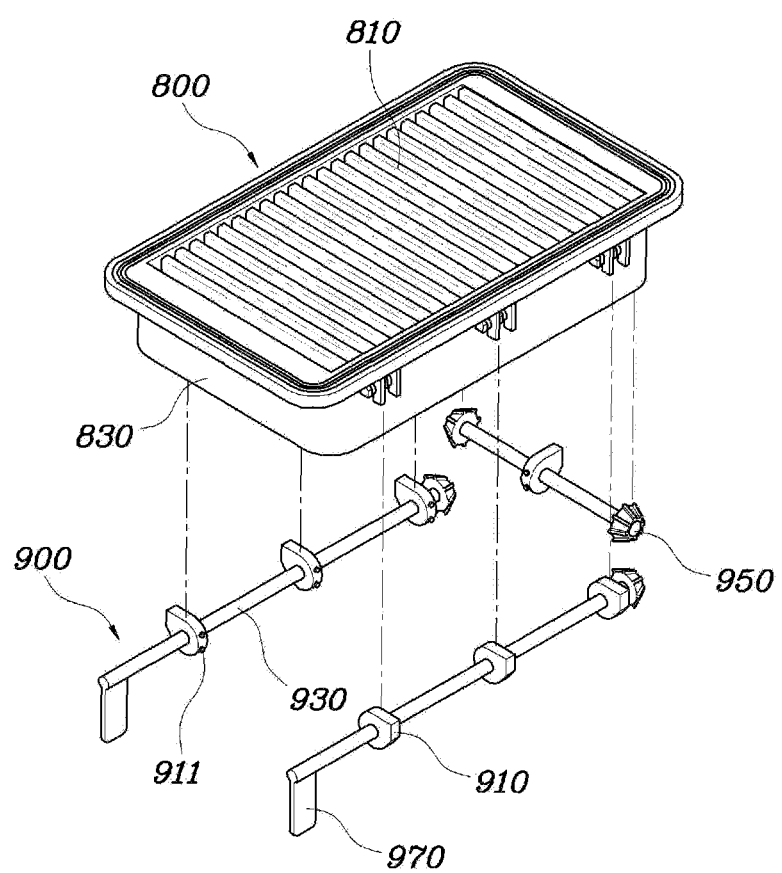

AIR CLEANER APPARATUS FOR VEHICLE AND MOLD UNIT FOR FABRICATING THE SAME

CROSS-REFERENCE TO RELATED APPLICATION

The present application claims priority of Korean Patent Application Number 10-2014-0041915 filed on Apr. 8, 2014, the entire contents of which application are incorporated herein for all purposes by this reference.

BACKGROUND OF THE INVENTION

Field of the Invention

The present invention relates, in general, to an air cleaner apparatus for a vehicle and a mold unit for fabricating the same and, more particularly, to an air cleaner for a vehicle and a mold unit for fabricating the same, in which the airtightness and strength of a case of the air cleaner is increased to reduce noise emission while the vehicle is being driven, thereby improving noise, vibration and harshness (NVH) performance.

Description of Related Art

Typically, an intake system of a vehicle takes in external air, which is used for combustion. When impurities are introduced into an engine, the engine may be damaged due to abnormal combustion or trouble in the engine, which are problematic. Therefore, the intake system is configured such that the intake external air passes through an air cleaner and a filter member filters impurities from the air.

The filter member is provided inside the air cleaner. The filter member is consumable part that must be replaced after a certain period of time has passed. According to an air cleaner as the related art, the air cleaner has the shape of a drawer having a replacement cover at the front such that the filter member can be easily stored into or taken out of the air cleaner without the necessity of detaching the replacement cover from a body.

In this air cleaner for a vehicle, the cover and the body are coupled with each other by vibration welding using ultrasonic waves. In general, ultrasonic welding is a technique whereby electric energy is generated from a power supply of a welder in response electric power being inputted, the electric energy is converted into mechanical vibration energy using a vibrator and a booster, and then the vibration energy is transmitted to workpieces to be machined by means of a tool horn. When the vibration energy is transmitted to the workpieces through the tool horn, strong vibration generates frictional heat such that welding and bonding occurs at bonding surfaces of the workpieces. This ultrasonic welding is widely used for welding plastic or metal, suturing fabric or film, welding cable terminals, or the like.

In the related art, however, a welding surface where the cover and the body are welded is positioned at an upper side, and thus is positioned inside a receptacle into or from which the filter member is stored or taken. After the welding process of the cover and the body, it is difficult to ensure dimensional stability against deformation. When the welding surface is formed at a lower position in order to overcome this problem, a sufficient space is not obtained, and thus a sealing structure is not formed, which is problematic.

In addition, a flange structure that is formed to fix the cover and the body when welding the cover and the body together leads to a molding condition that allows a strength-increasing reinforcement rib to be formed only in one direction, i.e. a vertical direction.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an air cleaner apparatus for a vehicle and a mold unit for fabricating the same, in which an integral reinforcement structure is added in order to increase the strength of a cover and a body, a reliable seal structure is produced by obtaining a sufficient space while adapting welding surfaces to a lower position, and reinforcement ribs for increasing the strength of the body are additionally provided. It is therefore possible to increase the strength of the air cleaner and thus improve the noise, vibration and harshness (NVH) performance of the air cleaner.

In an aspect of the present invention, there is provided an air cleaner apparatus for a vehicle. The air cleaner apparatus includes a body defining therein a storage space. The body has an intake port through which air is to be taken in, a support section which is disposed at an upper portion and is laterally bent, and plate-shaped reinforcement members which are disposed above the storage space, each of the reinforcement members having a predetermined thickness. The air cleaner apparatus also includes a cover coupled to the upper portion of the body. The cover defines therein a storage space, and has a discharge port at one side through which air is to be discharged and a coupling section which is disposed at a lower side which is laterally bent. The storage part includes an opening which is provided at front sides of the body and the cover, and serves as an entrance through which a filter member is stored or taken out. The air cleaner apparatus also includes a plate-shaped cover coupled to a front portion of the storage part in order to open or close the storage part.

According to an embodiment of the present invention, the body may have grid-shaped ribs which protrude outward from side surfaces, the ribs being spaced apart from each other at predetermined distances.

The support section of the body may extend a predetermined length in a lateral direction, extend downward, and then extend in a lateral direction.

The coupling section of the cover may extend a predetermined length in a lateral direction, extend downward, and then extend in a lateral direction.

The support section of the body may have a bent portion corresponding to a bent portion of the coupling section of the cover, such that the support section of the body and the coupling section of the cover are fit-engaged with each other and then welded together in response to vibration being generated by ultrasonic waves or the like.

The support section of the body may have a fitting recess at a lower portion. The fitting recess has a plurality of bent portions such that a welding jig is to be fitted into the fitting recess for vibration welding.

The filter member may be fitted into and coupled with an upper portion of the support section of the body.

The air cleaner apparatus may further include a driving member disposed between the support section of the body and an upper portion of the filter member.

The driving member may include a plurality of cam shafts on each of which at least one cam is disposed and bevel gears which connect the cam shafts to each other. The operation of the driving member allows the filter member to be stored and taken out.

Each of the reinforcement members may have a reinforcement hole having a predetermined depth in a top-bottom direction.

According to another aspect of the present invention, there is provided a mold unit for fabricating a case of the air cleaner apparatus as mentioned above. The mold unit includes a rectangular box-shaped lower mold having a first fitting recess which is recessed outward from an inner side surface, the first fitting recess having a predetermined width and length. The mold unit also includes a cover-shaped upper mold coupled with an upper portion of the lower mold, the upper mold having a second fitting recess which is recessed inward and extends upward from the first fitting recess. The mold unit also includes a sliding mold fitted through the first fitting recess and the second fitting recess, the shape of the sliding mold corresponding to that of an outer surface of a side portion of the body. The sliding mold has grid grooves formed in an inner surface. The grid grooves are spaced apart from each other at predetermined distances.

According to the air cleaner apparatus for a vehicle and the mold unit for fabricating the same which are configured as described above, it is possible to advantageously form the horizontal ribs using the sliding molds added to the upper and lower molds, unlike the related art in which only the vertical ribs can be formed. It is therefore possible to impart the body of the air cleaner with the grid-shaped ribs, which increase the strength of the air cleaner and improve the NVH performance. In addition, the reinforcement members are additionally molded inside the support section concurrently with the formation of the body, thereby advantageously increasing the strength of the air cleaner.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 6 is an exploded perspective view showing a driving member and a filter member of an air cleaner for a vehicle according to another exemplary embodiment of the present invention.

Figure 1:
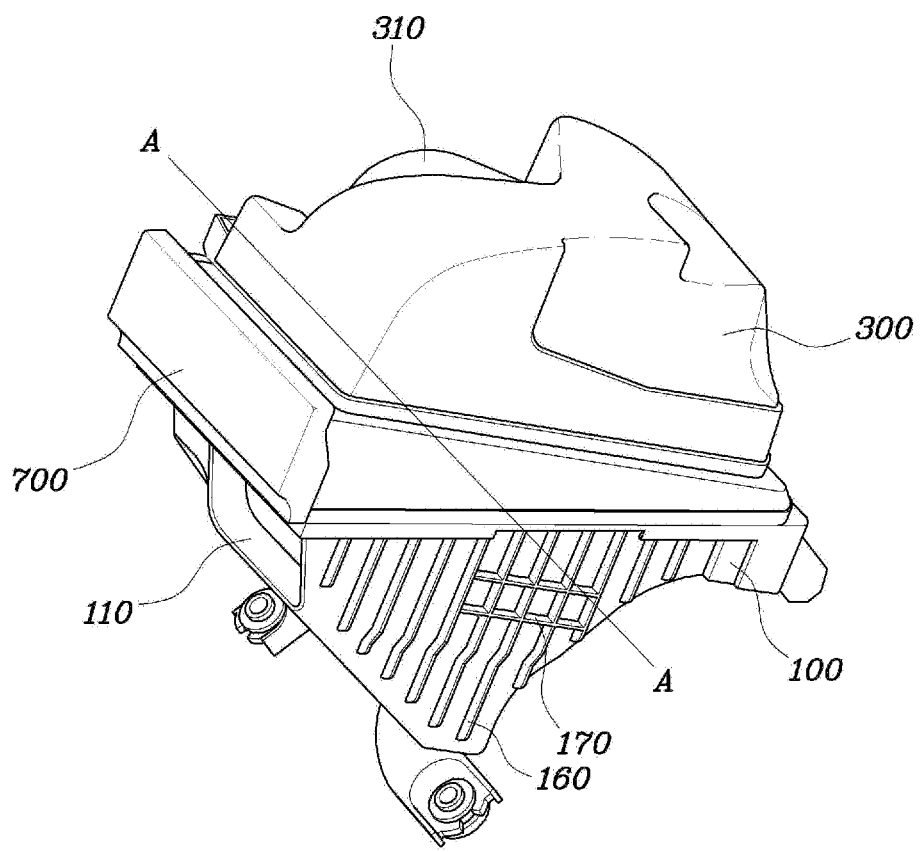
FIG. 1 is a perspective view showing an air cleaner for a vehicle according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 2:
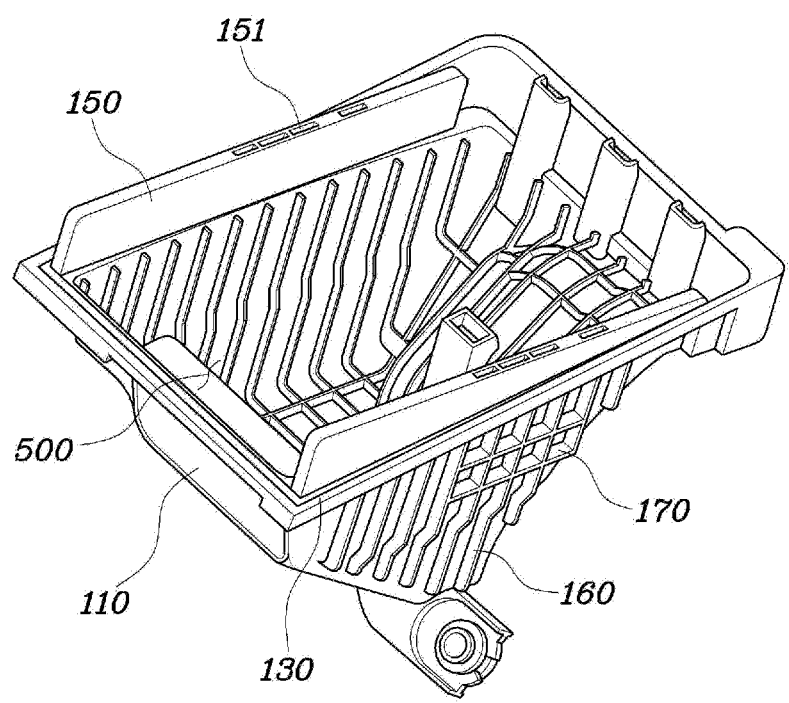
FIG. 2 is a perspective view showing the body of the air cleaner shown in FIG. 1.
Figure 3:
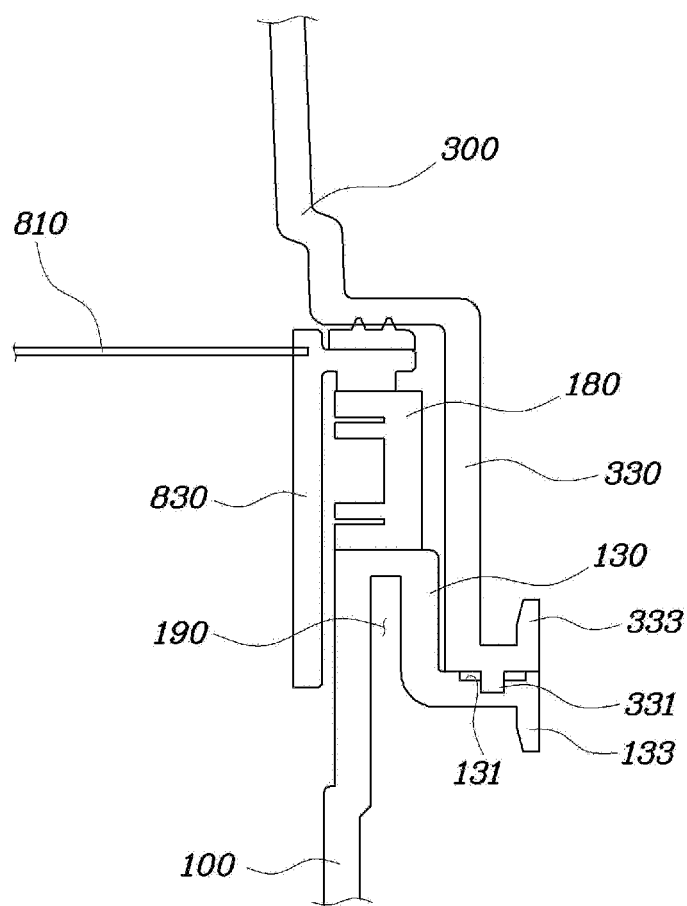
FIG. 3 is a cross-sectional view taken along line A-A in FIG. 1.
Figure 4:
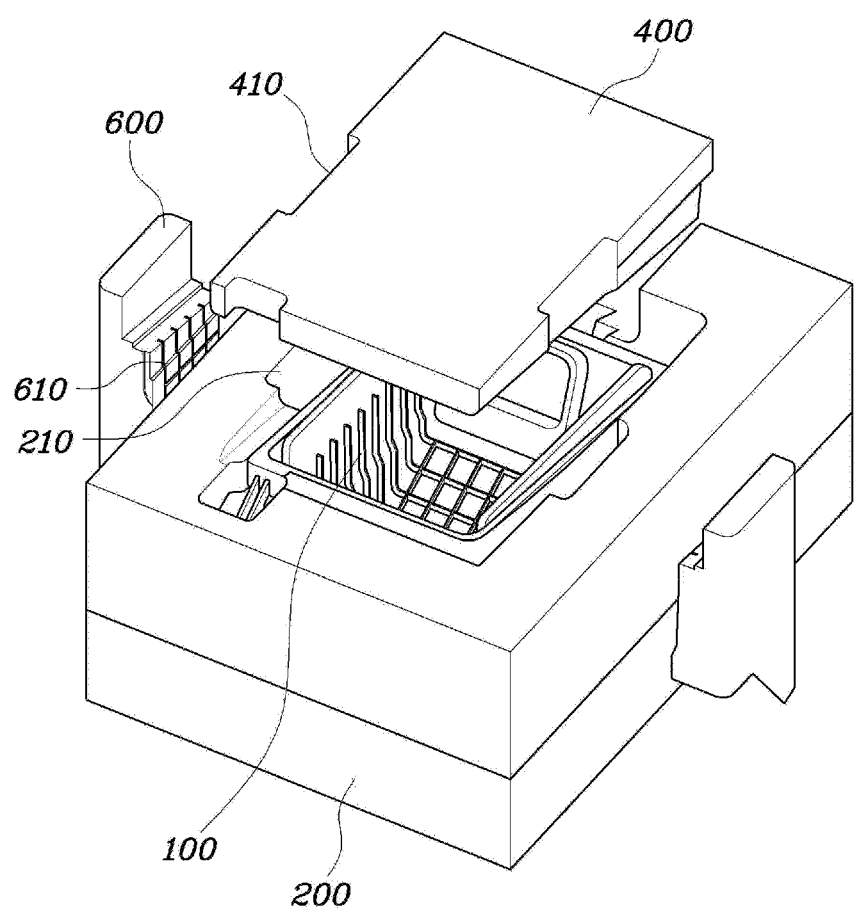
FIG. 4 is a view showing a mold unit for fabricating an air cleaner for a vehicle according to an exemplary embodiment of the present invention.
Figure 5:
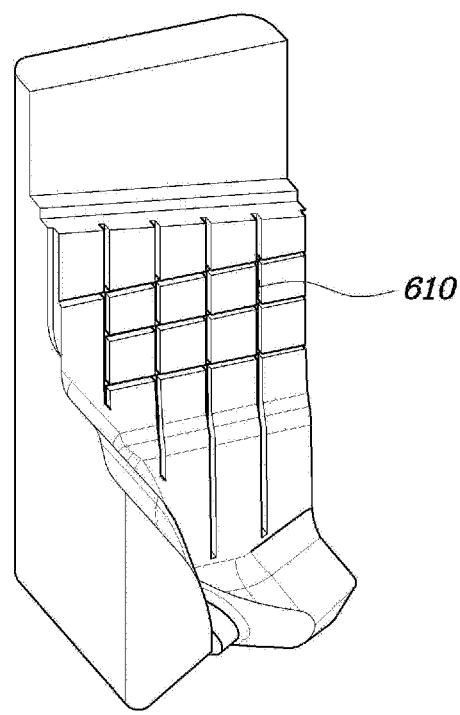
FIG. 5 is a detailed view of the sliding mold shown in FIG. 4.

FIG. 1 is a perspective view showing an air cleaner for a vehicle according to an exemplary embodiment of the present invention, FIG. 2 is a perspective view showing a body 100 of the air cleaner shown in FIG. 1, and FIG. 3 is a cross-sectional view taken along line A-A in FIG. 1. FIG. 4 is a view showing a mold unit 200, 400 and 600 for fabricating an air cleaner for a vehicle according to an exemplary embodiment of the present invention, FIG. 5 is a detailed view of a sliding mold 600 shown in FIG. 4. FIG. 6 is an exploded perspective view showing driving members 900 and a filter member 800 of an air cleaner for a vehicle according to another exemplary embodiment of the present invention.

The air cleaner for a vehicle according to an exemplary embodiment includes the body 100 as well as a cover 300, a storage part 500 and a cover 700. The body 100 has defined therein a storage space. The body 100 has an intake port 110 through which air can be taken in, a support section 130 which is disposed at the upper portion and is laterally bent, and reinforcement members 150 which are disposed above the storage space and have the shape of a plate having a preset thickness. The cover 300 is coupled to the upper portion of the body. The cover 300 has defined therein a storage space, and has a discharge port 310 at one side through which air can be discharged and a coupling section 330 which is disposed at the lower side and is laterally bent. The storage part 500 is an opening which is provided at the front side of the body 100 and the cover 300, and serves as an entrance through which the filter member 800 is stored or taken out. The cover 700 has the shape of a plate, and is coupled to the front portion of the storage part 500 in order to open or close the storage part 500.

Describing the flow of air in the air cleaner according to this exemplary embodiment, the air taken in from the outside of a vehicle is introduced into the air cleaner through the intake port 110 of the body 100. Impurities are filtered from the intake air through the filter member 800, and then the filtered air is supplied to an engine through the discharge port 310 of the cover 300. The air cleaner for a vehicle has an enclosed space defined by the body 100 and the cover 300, and the filter member 800 is coupled to the upper portion of the support section 130 of the body 100 inside the enclosed space. In replacement of the filter member 800, the front cover 700 is opened and closed so that the filter member 800 is taken out and stored through the storage part 500.

The filter member 800 is stored or accommodated in the air cleaner through the storage part 500, which can be formed at one side where the support section 130 of the body 100 and the coupling section 330 of the cover 300 adjoin to each other. Thus, the storage part 500 has the shape corresponding to that of the filter member 800. The filter member 800 has been described as being a dry filter that uses a filter paper or a synthetic resin according to this embodiment, but can be implemented as a wet filter in some cases. This configuration can be altered depending on the design or environment.

The filter member 800 can include a filter paper 810 which filters impurities and an edge member 830 which surrounds the outer circumference of the filter paper 810. The filter paper 810 is folded in a plurality of layers so as to have a sufficient filtering area. The edge member 830 is configured as a frame that has the shape corresponding to the storage space inside the air cleaner. The edge member 830 has a flange at the upper side which laterally protrudes outward. The flange is caught by the body 100 such that the edge member 830 is firmly supported.

The body 100 has grid-shaped ribs 160 and 170 which protrude outward from side surfaces and are spaced apart from each other at preset distances. In the related art, the ribs are formed in the vertical direction, i.e. the direction in which a mold unit is removed, due to the molding characteristics of the body, and thus strength is unreliable. However, the characteristics of the conventional mold unit make it difficult to apply a separate reinforcement structure which can enhance the strength. In particular, when a left surface is wide, the strength of the central section is weak, thereby increasing a risk to be damaged due to vibrations of or impacts on the vehicle. In contrast, according to this exemplary embodiment, the mold unit 200, 400 and 600 is separately provided, and not only the vertical ribs 160 but also the horizontal ribs 170 are formed by injection molding using the mold unit 200, 400 and 600. Thus, the strength of the body 100 can be increased to be higher than that of the conventional air cleaner body. It is difficult to adapt the conventional mold unit for this configuration. Thus, the body is molded using the separate mold unit 200, 400 and 600, whereby the displacement of the air cleaner is restrained, and the separate reinforcement structures, such as the horizontal ribs 170 and the reinforcement members 150, can be applied. Herein, the mold unit 200, 400 and 600 for the air cleaner for a vehicle will be described in detail later.

The support section 130 of the body 100 extends a preset length outward in a lateral direction, extends downward, and then extends outward in a lateral direction. The coupling section 330 of the cover 300 also extends a preset length outward in a lateral direction, extends downward, and then extends outward in a lateral direction. Thus, the support section 130 of the body 100 and the coupling section 330 of the cover 300 are configured to correspond to each other such that they can closely adjoin to each other and be more firmly fit-engaged with each other. After the body 100 and the cover 300 are engaged with each other, they can be welded together in response to lateral vibration driven by ultrasonic waves. Then, the body 100 and the cover 300 are strongly bonded, thereby increasing the airtightness of the air cleaner. In an exemplary embodiment, the support section 130 and the coupling section 330 can be additionally provided with an engagement protrusion 331 and an engagement recess 131 in order to realize a double fixing structure and increase the airtightness. In addition, extensions 133 and 333 which extend upward and downward can be provided on distal ends of the support section 130 and the coupling section 330.

The support section 130 of the body 100 has a fitting recess 190 at the lower portion. The fitting recess 190 is defined by the portion of the body 100 that laterally extends a preset length from the upper side of the body 100, is bent downward, and then laterally extends again. When the body 100 and the cover 300 are coupled with each other by welding using, for example, ultrasonic waves, a welding jig is fitted into the fitting recess 190. Thus, it is advantageous in that the separate jig is not used in the welding of the body 100 and the cover 300. The body 100 and the cover 300 are more firmly supported by the support section 130 and the fitting recess 190.

The body 100 has the reinforcement members 150 which are formed integrally with the body 100 by molding. Each of the reinforcement members 150 has an n-shaped cross-section. The reinforcement members 150 increase the strength of the fastening between the body 100 and the cover 300. In addition, each of the reinforcement members 150 has a plurality of reinforcement holes 151 which have a preset depth in the top-bottom direction. Thus, when the mold unit 200, 400 and 600 is removed after the body 100 is molded, the reinforcement holes 151 allow the direction in which the mold unit 200, 400 and 600 is removed to be altered from the direction in which the mold unit is removed in the related art. This can consequently facilitate the process when the body 100 is molded. The reinforcement holes 151 can also be formed in the support section 130 or the like of the body 100.

In addition, the edge member 830 of the filter member 800 is coupled in the space between the support section 130 of the body 100 and the coupling section 330 of the cover 300. A clamping member 180 is provided between the upper portion of the edge member 830 and the support section 130 in order to more firmly support the filter member 800. A reliable seal can also be provided between the body 100 and the cover 300.

FIG. 6 is an exploded perspective view showing the driving members 900 and the filter member 800 of the air cleaner for a vehicle according to another exemplary embodiment of the present invention. This figure shows the driving members 900 which are accommodated inside the air cleaner and the filter member 800 which is coupled to the upper portion of the driving members 900. The driving members 900 are shown and described as being added between the support section 130 of the air cleaner body 100 shown in FIG. 1 and the upper portion of the filter member 800. The driving members 900 of the body 100 includes a plurality of cam shafts 930 on each of which at least one cams 910 is provided and bevel gears 950 which connect the camp shafts 930 to each other. Thus, the operation of the driving members 900 allows the filter member 800 to be stored and taken out.

Describing in greater detail, the cam shafts 930 of the driving members 900 rotate in response to handlebars 970 connected to the driving members 900 being rotated by a user and the cams 910 rotate in response to the rotation of the cam shafts 930 so that the filter member 800 move upward or downward in the top-bottom direction so that the filter member 800 is stored or taken out. The cam shafts 930 are respectively provided on three sides of the body 100 and the cover 300 except for the side of the storage part 500. The bevel gears 950 are formed at specific ends of the cam shafts 930 where the cam shafts 930 adjoin to each other such that all of the cam shafts 930 rotate together in the engaged state in response to the handlebars 970 being rotated. The plurality of cams 910 are provided on the cam shafts 930 in the longitudinal direction. Each of the cams 910 has a greater diameter than the axial diameter of the cam shafts 930, and is configured such that one portion of each of the cams protrudes outward and is expanded. When a user grasps and turns the handlebars 970, which are provided on specific ends of the cam shafts 930, the protruding portions of the cams 910 are supported on the support section 130 of the body 100, thereby moving the filter member 800 upward.

As shown in FIG. 6, each of the cams 910 can be configured such that the protruding portion has a right angle between two surfaces, i.e. the upper surface and the side surface on the paper surface, and has a round surface at the lower portion. This configuration allows the cams 910 to rotate only in one direction. The cams 910 cannot rotate at the protruding portions that define a right joint angle since the protruding portions are abutted to the support section 130, but can rotate only along the round surface.

In addition, each of the cams 910 can have rotation-limiting protrusions 911 which protrude from the other side. With the rotation-limiting protrusions 911, the user can move the filter member 800 upward by rotating the cam shafts 930 only by applying a preset amount of pressing force. The rotation-limiting protrusions 911 serve to prevent the cam shafts 930 from accidently rotating in response to vibrations or impacts occurring during driving of the vehicle.

Therefore, as shown in FIG. 6, the filter member 800 and the driving members 900 coupled to the lower portion of the flange thereof are initially stored through the storage part 500 formed in the body 100 and the cover 300 in the state in which the cams 910 are rotated such that the protruding and expanded portions of the cams 910 are directed in the horizontal direction. When the filter member 800 is completely stored, the handlebars 970 are turned to rotate the cam shafts 930 so that the protruding and expanded portions of the cams 910 face downward. Thus, this configuration causes the protruding portions of the cams 910 to be supported on the support section 130 of the body 100, whereby the filter member 800 is moved upward and closely adjoins to the upper portion of the storage part 500.

According to this configuration, the cam shafts 930 are rotated in response to the cam shafts 930 being turned with the handlebars 970. The pair of cam shafts 930 can be rotated concurrently, or in some cases, both of the pair of cam shafts 930 can be rotated in response to one of the handlebars 970 connected to the pair of cam shafts 930 being turned.

Thus, the filter member 800 is brought into close contact with the body 100 and the cover 300 of the air cleaner in response to the driving members 900 being driven. Then, the filter member 800 is not shaken by the pressure of air flow that circulates in the air cleaner, and thus does not generate vibration noise. In addition, since the filter member 800 is in close contact with the body 100 and the cover 300, it is possible to prevent air from leaking, thereby preventing a leaking sound. Furthermore, the filter member 800 is easily and simply brought into close contact with the body 100 and the cover 300 in response to the simple operation of rotating the driving members 900, thereby preventing gaps which would otherwise generate noise.

According to the air cleaner for a vehicle, the horizontal ribs 170 added to the side surfaces of the body 100 and the reinforcement members 150 added to the inner surface of the body 100 increase the strength of the air cleaner. This configuration accordingly prevents noise or vibration that would otherwise be generated in response to pulsation caused by vibrations or impacts occurring inside the air cleaner during driving, thereby improving the noise, vibration and harshness (NVH) performance of the vehicle.

In addition, since the welds where the body 100 and the cover 300 are coupled to each other by welding can be formed at lower positions than those of the related art, a sufficient storage space can be obtained inside the air cleaner. It is advantageous that the entire circumferences of the body 100 and the cover 300 can be welded. In particular, since the filter member 800 is configured such that it can be stored and taken out using the cam shafts 930, a sufficient space can be obtained even if the driving members 900 are disposed, thereby providing a reliable seal. This configuration can obtain a basic level of strength from vibration welding, and it is advantageously possible to improve the quality of welding and increase dimension matching by limiting variations in welding using the fitting recess 190. Therefore, it is possible to provide a reliable seal to the air cleaner for a vehicle, and thus increase airtightness and the strength of fastening, thereby reducing the weight and price.

FIGS. 4 and 5 separately show the mold unit 200, 400 and 600 which is used for molding the air cleaner for a vehicle according to an exemplary embodiment of the present invention.

The mold unit 200, 400 and 600 for fabricating the air cleaner for a vehicle according to an exemplary embodiment of the present invention includes a lower mold 200, an upper mode 400 and sliding molds 600. The lower mold 200 has the shape of a rectangular box, and has first fitting recesses 210 which are recessed outward from the inner side surfaces, the first fitting recesses 210 having a preset width and length. The upper mold 400 has the shape of a cover, and is coupled to the upper portion of the lower mold 200. The upper mold 400 has second fitting recesses 410 which are recessed inward and extend upward from the first fitting recesses 210. The sliding molds 600 are respectively fitted through the first fitting recess 210 and the second fitting recess 410 at one side and through the first fitting recess 210 and the second fitting recess 410 at the other side. The shapes of the sliding molds correspond to that of outer surfaces of the side portion of the body 100. Each of the sliding molds 600 has grid grooves 610 formed in the inner surface, the grid grooves 610 being spaced apart from each other at preset distances.

As shown in FIG. 5, the sliding molds 600 which are provided in addition to the upper mold 400 and the lower mold 200 are fitted into the both side portions of the upper and lower molds 400 and 200. Each of the sliding molds 600 has a preset thickness and a preset width, and extends a predetermined length in the top-bottom direction. The grid grooves 610 having the shape of a grid extend in the top-bottom direction and in the horizontal direction in the inner surfaces of the sliding molds 600. These grid grooves 610 allow not only the vertical ribs 160 but also the horizontal ribs 170 to be formed on the side surfaces of the body 100 unlike in the related art, thereby increasing the strength of the body 100. The sliding molds 600 are formed corresponding to the second fitting recesses 410 and the first fitting grooves 210 formed in the upper mold 400 and the lower mold 200, and are slid and fitted into the fitting grooves 410 and 210 in the top-bottom direction.

In fabrication of the air cleaner for a vehicle, the body 100 and the cover 300 are respectively fabricated by molding in the mold unit 200, 400 and 600, and then are coupled with each other by welding in which lateral vibration is applied using ultrasonic waves or the like. Describing the fabrication of the body 100 in greater detail, the outer portions of the reinforcement members 150 are formed by the upper mold 400, and the inner portions of the reinforcement members 150 are formed by the lower mold 200. In addition, the central portions are molded using the sliding molds 600 coupled to the upper and lower molds 400 and 200. Accordingly, the mold units 200, 400 and 600 are removed from the body 100 in the order in which the upper mold 400 and the lower mold 200 are removed and then the sliding molds 600 are removed. After that, the body 100 and the cover 300, which are respectively molded, are coupled with each other, and then the welding jigs are fixed to the fitting recesses 190 formed in the support section 130 of the body 100. Then, the body 100 and the cover 300 are vibrated in the lateral direction for welding.

The mold unit for the air cleaner for a vehicle as set forth above can advantageously form the horizontal ribs using the sliding molds added to the upper and lower molds, unlike the related art in which only the vertical ribs can be formed. It is therefore possible to impart the body of the air cleaner with the grid-shaped ribs, which increase the strength of the air cleaner and improve the NVH performance. In addition, the reinforcement members are additionally molded inside the support section concurrently with the formation of the body, thereby advantageously increasing the strength of the air cleaner.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An air cleaner apparatus for a vehicle comprising:
a body defining therein a storage space, wherein the body comprises an intake port through which air is to be taken in, a support section which is disposed at an upper portion of the body and is laterally bent, and plate-shaped reinforcement members which are disposed above the storage space, each of the reinforcement members having a predetermined thickness;
a cover coupled to the upper portion of the body, wherein the cover defines therein the storage space, and comprises a discharge port at one side through which air is to be discharged and a coupling section which is disposed at a lower side which is laterally bent;
a storage part including an opening which is provided at front sides of the body and the cover, and serves as an entrance through which a filter member is stored or taken out;
a plate-shaped cover coupled to a front portion of the storage part and configured to open or close the storage part; and
a driving member disposed between the support section of the body and an upper portion of the filter member,
wherein the driving member comprises a plurality of cam shafts on each of which at least one cam is disposed and bevel gears which connect the cam shafts to each other, wherein an operation of the driving member allows the filter member to be stored and taken out.

2. The air cleaner apparatus according to claim 1, wherein the body comprises grid-shaped ribs which protrude outward from side surfaces, the ribs being spaced apart from each other at predetermined distances.

3. The air cleaner apparatus according to claim 1, wherein the support section of the body extends a predetermined length in a lateral direction, extends downward, and then extends in the lateral direction.

4. The air cleaner apparatus according to claim 1, wherein the coupling section of the cover extends a predetermined length in a lateral direction, extends downward, and then extends in the lateral direction.

5. The air cleaner apparatus according to claim 1, wherein the support section of the body has a bent portion corresponding to a bent portion of the coupling section of the cover, such that the support section of the body and the coupling section of the cover are fit-engaged with each other and then welded together in response to vibration being generated by ultrasonic waves.

6. The air cleaner apparatus according to claim 1, wherein the support section of the body has a fitting recess at a lower portion, the fitting recess having a plurality of bent portions such that a welding jig is to be fitted into the fitting recess for vibration welding.

7. The air cleaner apparatus according to claim 1, wherein the filter member is fitted into and coupled with an upper portion of the support section of the body.

8. The air cleaner apparatus according to claim 1, wherein each of the reinforcement members has a reinforcement hole having a predetermined depth in a top-bottom direction.

* * * * *